United States Patent
Johnson

(10) Patent No.: US 7,394,502 B2
(45) Date of Patent: *Jul. 1, 2008

(54) METHOD AND SYSTEM FOR 2D COMB FILTERING OF A PAL VIDEO SIGNAL

(75) Inventor: Shawn Val Johnson, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 600 days.

This patent is subject to a terminal disclaimer.

(21) Appl. No.: 10/943,596

(22) Filed: Sep. 17, 2004

(65) Prior Publication Data

US 2005/0168649 A1 Aug. 4, 2005

Related U.S. Application Data

(60) Provisional application No. 60/540,819, filed on Jan. 30, 2004.

(51) Int. Cl.
*H04N 9/78* (2006.01)
(52) U.S. Cl. ...................... 348/667; 348/665
(58) Field of Classification Search ......... 348/663–670; H04N 9/78
See application file for complete search history.

(56) References Cited

U.S. PATENT DOCUMENTS

| 4,974,065 | A | * | 11/1990 | Murakami et al. | 348/668 |
| 5,523,850 | A | * | 6/1996 | Kanda et al. | 386/25 |
| 6,300,985 | B1 | * | 10/2001 | Lowe et al. | 348/665 |

* cited by examiner

*Primary Examiner*—M. Lee
(74) *Attorney, Agent, or Firm*—McAndrews, Held & Malloy, Ltd.

(57) ABSTRACT

Methods and systems for 2D comb filtering of a PAL video signal are provided. The method may comprise generating a plurality of interpolated pixels for corresponding video samples in non-adjacent pixel lines for a video frame. At least one direction of least bandwidth may be determined among the video samples and the interpolated pixels. The method may blend combing in the determined direction of least bandwidth. A plurality of interpolated pixels for corresponding video samples may be generated in a first pixel line of the video frame. The plurality of interpolated pixels in the first pixel line may be shifted, so that each of the plurality of interpolated pixels in the first pixel line is one quarter cycle phase-shifted from a corresponding adjacent pixel in the first pixel line.

33 Claims, 13 Drawing Sheets

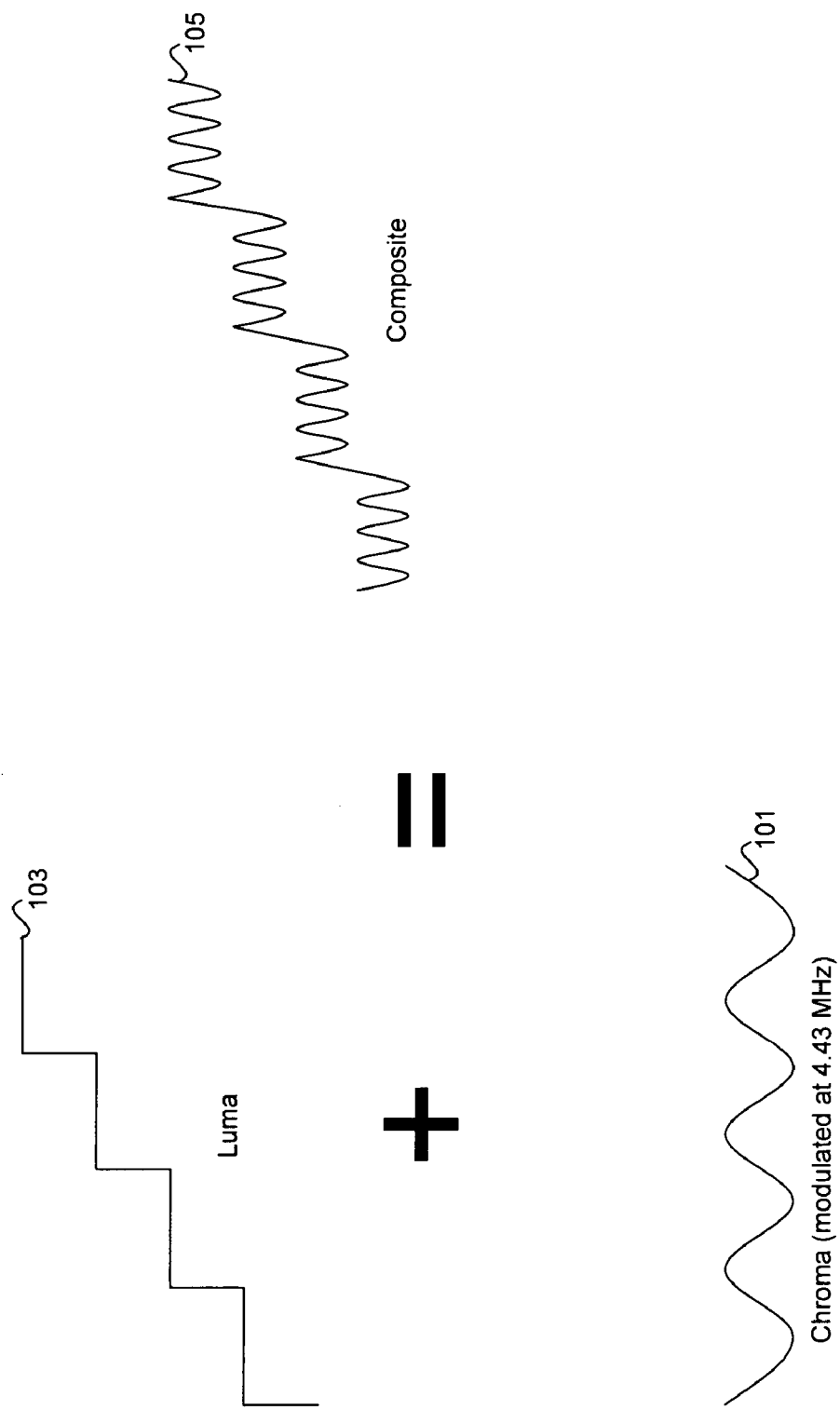

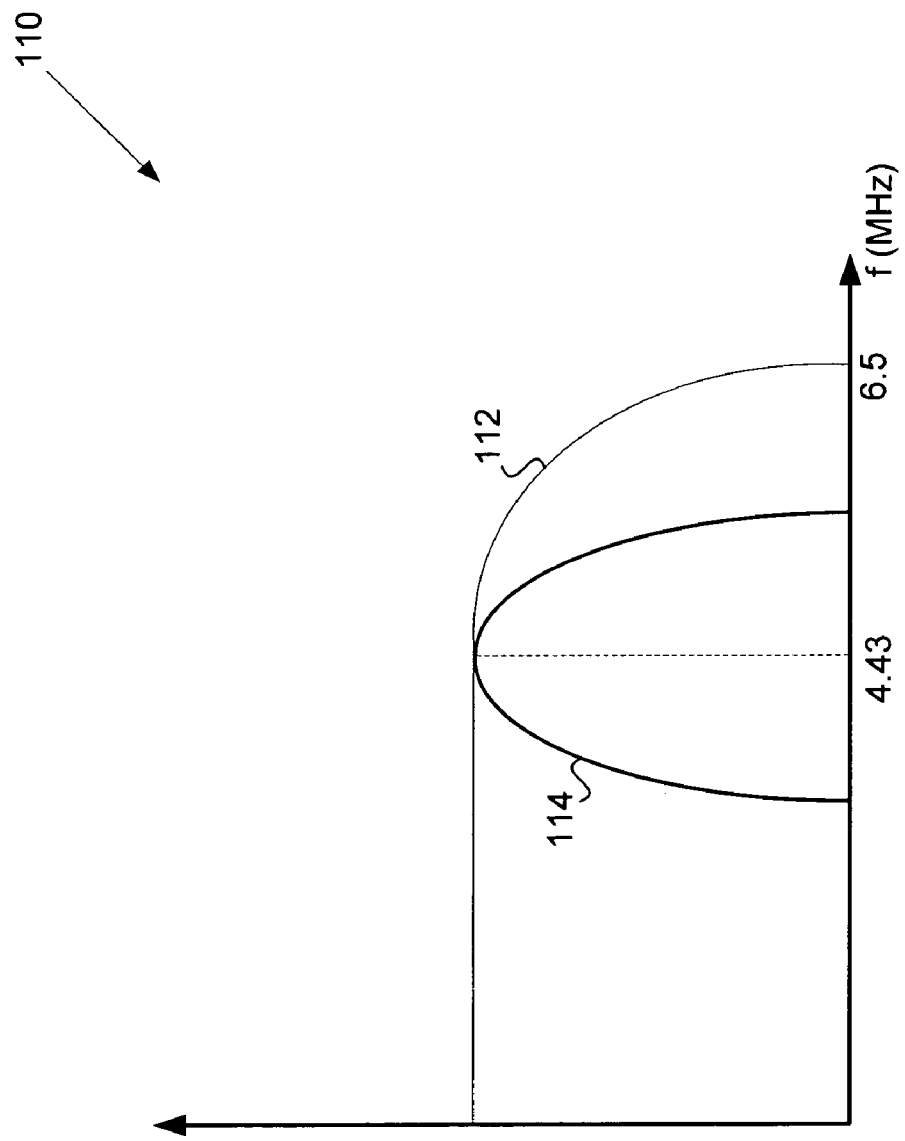

METHOD AND SYSTEM FOR 2D COMB FILTERING OF A PAL VIDEO SIGNAL

CROSS-REFERENCE TO RELATED APPLICATIONS

This application makes reference to, claims priority to, and claims the benefit of U.S. Provisional Application Ser. No. 60/540,819 filed Jan. 30, 2004 and entitled "2D Comb Filter for PAL."

This application makes reference to: U.S. application Ser. No. 10/943,267 filed Sep. 17, 2004; U.S. application Ser. No. 10/943,587 filed, Sep. 17, 2004; U.S. application Ser. No. 10/943,593 filed, Sep. 17, 2004; U.S. application Ser. No. 10/869,395 filed, Jun. 16, 2004; and U.S. application Ser. No. 10/943,641 filed, Sep. 17, 2004.

The above stated applications are hereby incorporated herein by reference in their entirety.

FIELD OF THE INVENTION

Certain embodiments of the invention relate to processing of video signals. More specifically, certain embodiments of the invention relate to a method and system for 2D comb filtering of a PAL video signal.

BACKGROUND OF THE INVENTION

A composite video signal is the sum of a luminance (brightness) signal and a chrominance (color) signal. These signals may are be referred to as luma and chroma signals, respectively. The frequency ranges of the luma and chroma signals are designed to overlap. In video processing, the luma and chroma signal components are added together in order to generate a composite video signal. Integrating the luma and chroma video elements into a composite video stream may facilitate video signal processing since only a single composite video stream is broadcasted. Once a composite signal is received, the luma and chroma signal components must be separated in order for the video signal to be processed and displayed. A comb filter may be utilized for separating the chroma and luma video signal components. For example, a television may utilize a comb filter and may be adapted to receive a composite video input. However, before the television can display the received video signal, the chroma and luma video components have to be separated.

FIG. 1A is a diagram illustrating generation of a conventional composite video signal. Referring to FIG. 1A, a conventional composite video signal 105 may be generated from a luma component 103 and a chroma component 101. The composite video signal 105 may be generated by adding the chroma video signal component 101 and the luma video signal component 103. The chroma signal component 101 may be modulated at 4.43 MHz and it may or may not comprise a constant chroma across the entire line. The luma signal component 103 may increase in amplitude in a stair step fashion or it may not.

A low-pass or band-pass filter may be utilized as a basic luma and chroma separator. Since the color information is in a frequency band centered around 4.43 MHz, the luma signal may be derived by filtering out the color information from the composite video signal with a low pass or notch filter.

FIG. 1B is a diagram illustrating overlapped luma signal 112 and chroma signal 114 in a composite video signal 110. Although low-pass filtering may effectively filter most of the chroma signal 114 out of the luminance signal 112, it may also remove the higher frequency luma signal components. This loss of bandwidth may reduce the horizontal resolution of the luminance signal 112, and fine details in the video picture may be lost. Similarly, the chroma signal 114 may be separated from the composite video signal 110 by using a band-pass filter centered at about 4.43 MHz to obtain only the frequencies between about 3.1 MHz and 5.7 MHz. However, such filtering may not completely filter out the luma present at that frequency and as a result video picture quality may remain limited.

FIG. 2A is a diagram illustrating modulated chroma signals in a composite video frame. The chroma component in a PAL video signal, for example, may be modulated so that a frequency of each successive line of video may be phase-shifted by 90 degrees with respect to the two lines previous. Referring to FIG. 2A, the current frame 201 may comprise two lines previous 203, a current line 205, and two lines next 207. The current line 205 in the current frame 201 may be phase-shifted by 180 degrees from the two lines previous 203 as well as from the two lines next 207 in the current frame 201. In this regard, the two lines previous 203 and the two lines next 207 are in phase.

In conventional video processing of a PAL video signal, there are two ways to separate the luma and chroma video components and these include combing horizontally and combing vertically. During separation of the luma and chroma components, there are two bandwidth directions that may incur losses in the separation process and in the separated signal. Depending on the combing method that is utilized, the separated signal may have reduced vertical bandwidth and/or horizontal bandwidth.

The first way to separate the luma and chroma video components in a PAL video signal is by horizontal combing. Horizontal combing may be accomplished by utilizing a notch filter, for example. Since the chroma signal component in a composite video signal may be modulated at 4.43 MHz, a notch filter set at 4.43 MHz may be utilized. Combing vertically may also be utilized to separate the luma and chroma video components. Combing vertically may be achieved in three different ways—the current line may be combed with two lines previous and two lines next, the current line may be combed with two lines previous, or the current line may be combed with two lines next. The vertical combing is performed spatially, which involves combing only within one field at a time and without any temporal combing.

During combing in the current frame 201, for example, if the current line 205 is added to two lines previous 203, the chroma content may cancel out and two times the luma content may be obtained. On the other hand, if two lines previous 203 is subtracted from the current line 205, the luma content may cancel out and two times the chroma content may be obtained. In this way, luma and chroma content may be separated from the PAL composite video signal for further processing. However, vertical combing in this manner may result in reduced vertical bandwidth.

FIG. 2B is a diagram illustrating combing of a correlated current line and a two lines previous in a current frame. In this case, there is no vertical bandwidth and the two lines previous and the current line are perfectly correlated. The current line may be added with the two lines previous and two times luma may be obtained. Similarly, the two lines previous may be subtracted from the current line so that two times chroma may be obtained.

FIG. 2C is a diagram illustrating combing of a non-correlated current line and a two lines previous in a current frame. In this case, there may be significant vertical bandwidth. The vertical bandwidth may be high enough so that there may be no correlation between the current line and the two lines previous. When the current line and the two lines previous are combed together, there may be significant error in both the luma and chroma. This may produce combing artifacts in the obtained combed video signal. Higher bandwidth in a given direction may cause combing in that direction to result in more incorrectly separated luma and chroma.

Further limitations and disadvantages of conventional and traditional approaches will become apparent to one of skill in the art, through comparison of such systems with some aspects of the invention as set forth in the remainder of the present application with reference to the drawings.

BRIEF SUMMARY OF THE INVENTION

Certain aspects of the invention may be found in a method and system for 2D comb filtering of a PAL video signal. More specifically, certain aspects of the invention may be found in a method for separating luma and chroma components in a composite video signal. The method may comprise generating a plurality of interpolated pixels for corresponding video samples in non-adjacent pixel lines for a video frame. At least one direction of least bandwidth may be determined among the video samples and the interpolated pixels. The method may then blend combing in the determined direction of least bandwidth. A plurality of interpolated pixels for corresponding video samples may be generated in a first pixel line of the video frame. The plurality of interpolated pixels in the first pixel line may be shifted, so that each of the plurality of interpolated pixels in the first pixel line is one quarter cycle phase-shifted from a corresponding adjacent pixel in the first pixel line. If the determined direction of least bandwidth is among in-phase pixels in the first pixel line, the video signal may be combed horizontally.

A plurality of interpolated pixels for corresponding video samples may be generated in a non-adjacent second pixel line of the video frame, so that each of the plurality of interpolated pixels in the second line is one half cycle phase-shifted from a corresponding pixel in the first pixel line. If the determined direction of least bandwidth is among corresponding in-phase pixels in the first pixel line and in the second pixel line, the video signal may be combed vertically. If the determined direction of least bandwidth is among corresponding one-half cycle phase-shifted video samples in the first pixel line and in the second pixel line for a luma-only video signal, the video signal may be combed vertically. The video signal may be combed in a horizontal direction and in a vertical direction for the video frame. The combing in a horizontal direction may be blended with combing in a vertical direction for the video frame. Non-adjacent pixel lines may be at least one pixel line apart.

Another aspect of the invention may provide a machine-readable storage, having stored thereon, a computer program having at least one code section executable by a machine, thereby causing the machine to perform the steps as described above for 2D comb filtering of a PAL video signal.

The system for 2D comb filtering of a PAL video signal may include a pixel interpolation logic that generates a plurality of interpolated pixels for corresponding video samples in non-adjacent pixel lines for a video frame. Chroma decision logic may determine a direction of least bandwidth among the video samples and the interpolated pixels. A chroma comb may blend combing according to the determined direction of least bandwidth. The pixel interpolation logic may generate a plurality of interpolated pixels for corresponding video samples in a first pixel line of the video frame. The pixel interpolation logic may also shift the plurality of interpolated pixels in the first pixel line, so that each of the plurality of interpolated pixels in the first pixel line is one quarter cycle phase-shifted with respect to a corresponding adjacent pixel in the first pixel line.

If the determined direction of least bandwidth is among in-phase pixels in the first pixel line, the chroma comb may comb horizontally. The pixel interpolation logic may generate a plurality of interpolated pixels for corresponding video samples in a non-adjacent second pixel line of the video frame, so that each of the plurality of interpolated pixels in the second line is one half cycle phase-shifted with respect to a corresponding pixel in the first pixel line. If the determined direction of least bandwidth is among corresponding in-phase pixels in the first pixel line and in the second pixel line, the chroma comb may comb vertically. If the determined direction of least bandwidth is among corresponding one-half cycle phase-shifted video samples in the first pixel line and in the second pixel line for a luma-only video signal, the chroma comb may comb vertically. The chroma comb may comb in a horizontal direction and a vertical direction for the video frame. The chroma comb may blend the combing in a horizontal direction and in a vertical direction for the video frame in order to maximize output video quality and minimize or eliminate artifacts. The non-adjacent pixel lines may be at least one pixel line apart.

Another aspect of the invention may include combing among non-adjacent pixel lines utilizing non-thresholded blending based on relative bandwidth in each of a plurality of two directions. Combing may utilize non-thresholded blending in a horizontal direction and/or in a vertical direction.

These and other advantages, aspects and novel features of the invention, as well as details of an illustrated embodiment thereof, will be more fully understood from the following description and drawings.

BRIEF DESCRIPTION OF SEVERAL VIEWS OF THE DRAWINGS

FIG. 1A is a diagram illustrating generation of a conventional composite video signal.

FIG. 1B is a diagram illustrating overlapped luma and chroma signals.

DETAILED DESCRIPTION OF THE INVENTION

Certain aspects of the invention may be found in a method and system for separating luma and chroma components in a composite video signal. Video samples, or true pixels, as well as a plurality of interpolated pixels for corresponding video samples, may be generated for a video frame. A direction of least bandwidth may be determined among the video samples and the interpolated pixels within a pixel line, as well as between pixel lines in the same video frame. Horizontal and/or vertical combing may then be utilized in the determined direction of least bandwidth. The combing in the horizontal and/or vertical direction may be blended.

Certain other aspects of the invention may be found in a method and system for 2D comb filtering of a PAL video signal, for example. During separation of the chroma and luma video components in a PAL composite video signal feed, combing horizontally and/or combing vertically may be utilized to achieve the chroma and luma separation. Since each of the these methods is associated with horizontal bandwidth losses and/or vertical bandwidth losses, respectively, a hybrid method may be applied where the two methods of combing may be blended so that bandwidth losses may be reduced to the maximum degree. A 2D comb filter may be adapted to utilize a plurality of methods for signal separation. For example, the 2D comb filter may be adapted to comb horizontally and/or vertically, allowing for the chroma and the luma video components in a PAL video signal to be separated with minimum bandwidth losses.

A 2D comb filter in accordance with an embodiment of the invention may be adapted to filter video information, such as PAL composite video signal, both horizontally along the scan lines and/or vertically between the horizontal scan lines. To filter horizontally, a low-pass or band-pass filter may be utilized. Combing may be utilized to filter vertically.

Figure 2A:
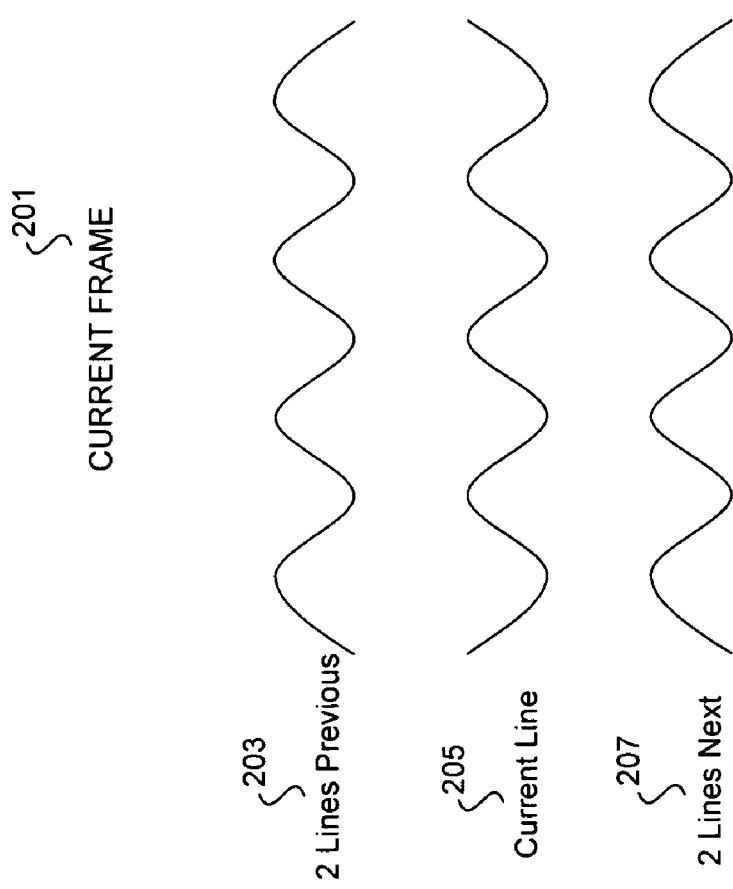
FIG. 2A is a diagram illustrating modulated chroma signals in a composite video frame.
Figure 2B:
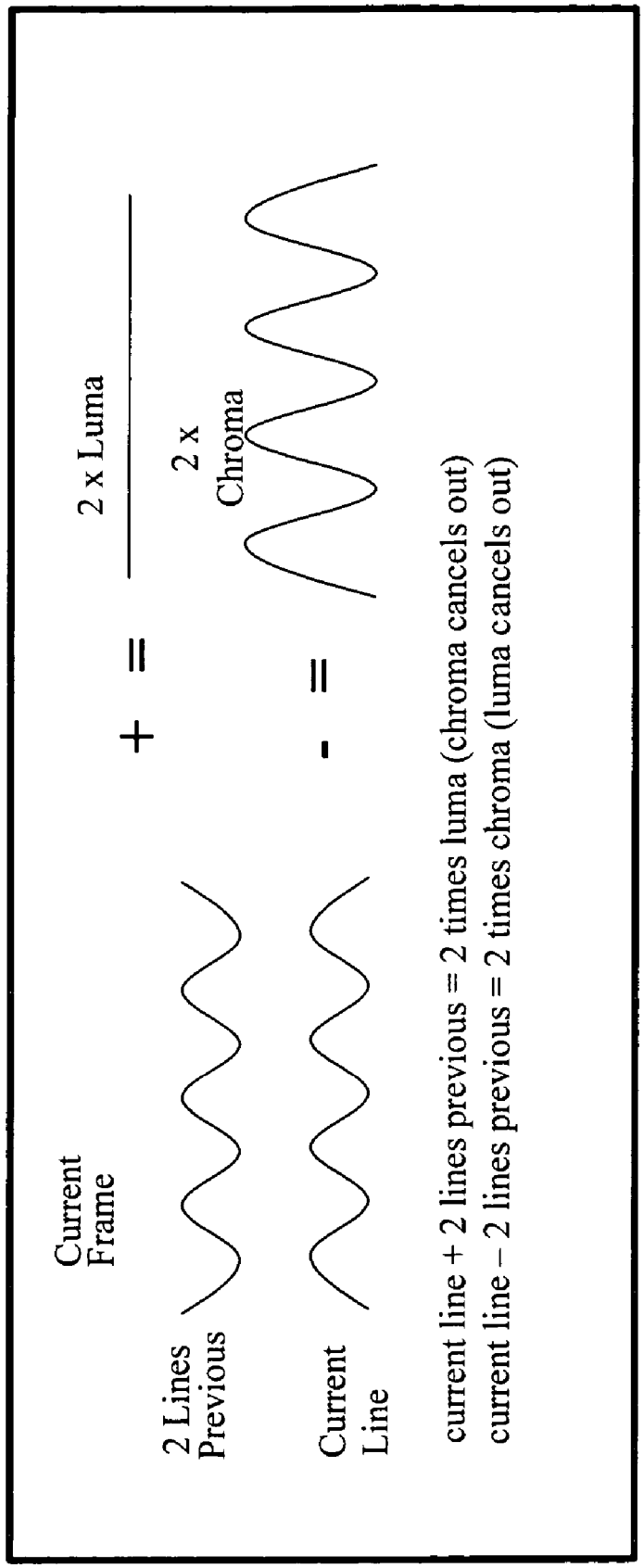
FIG. 2B is a diagram illustrating combing of a correlated current line and a two lines previous in a current frame.
Figure 2C:
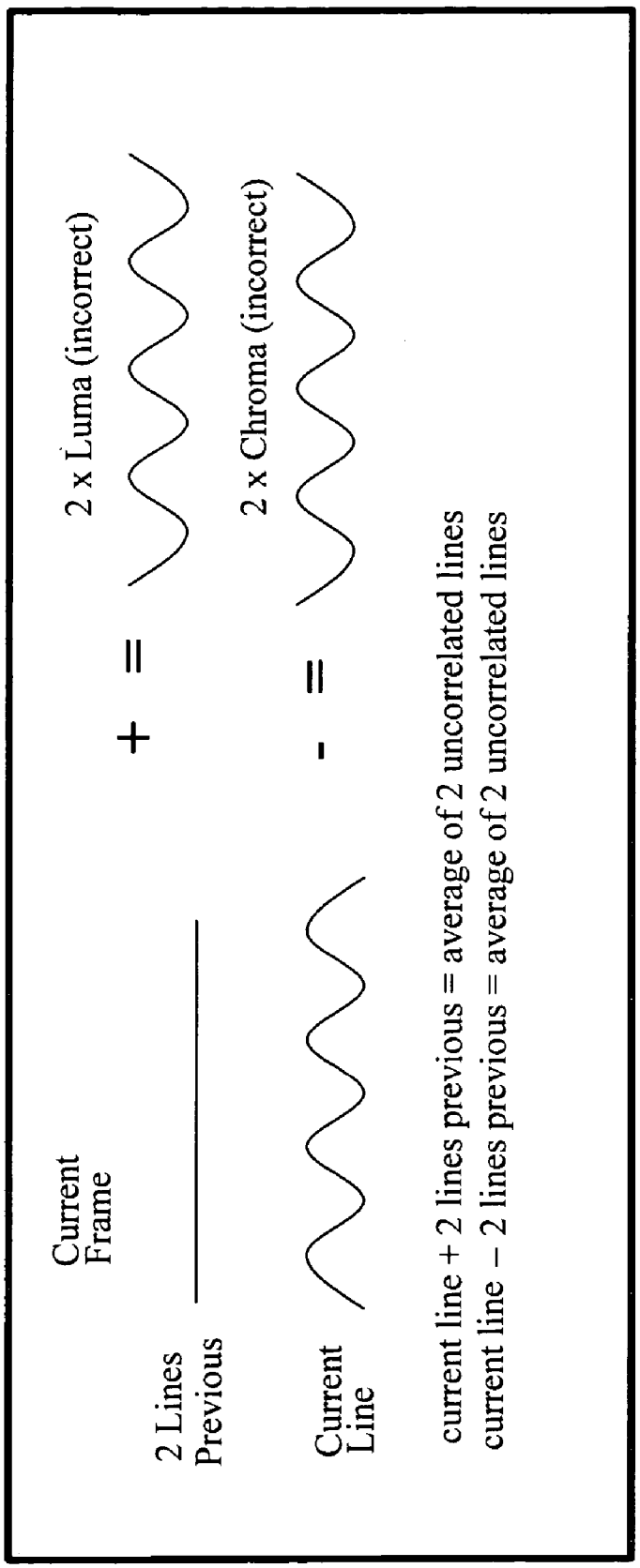
FIG. 2C is a diagram illustrating combing of a non-correlated current line and a two lines previous in a current frame.
Figure 3A:
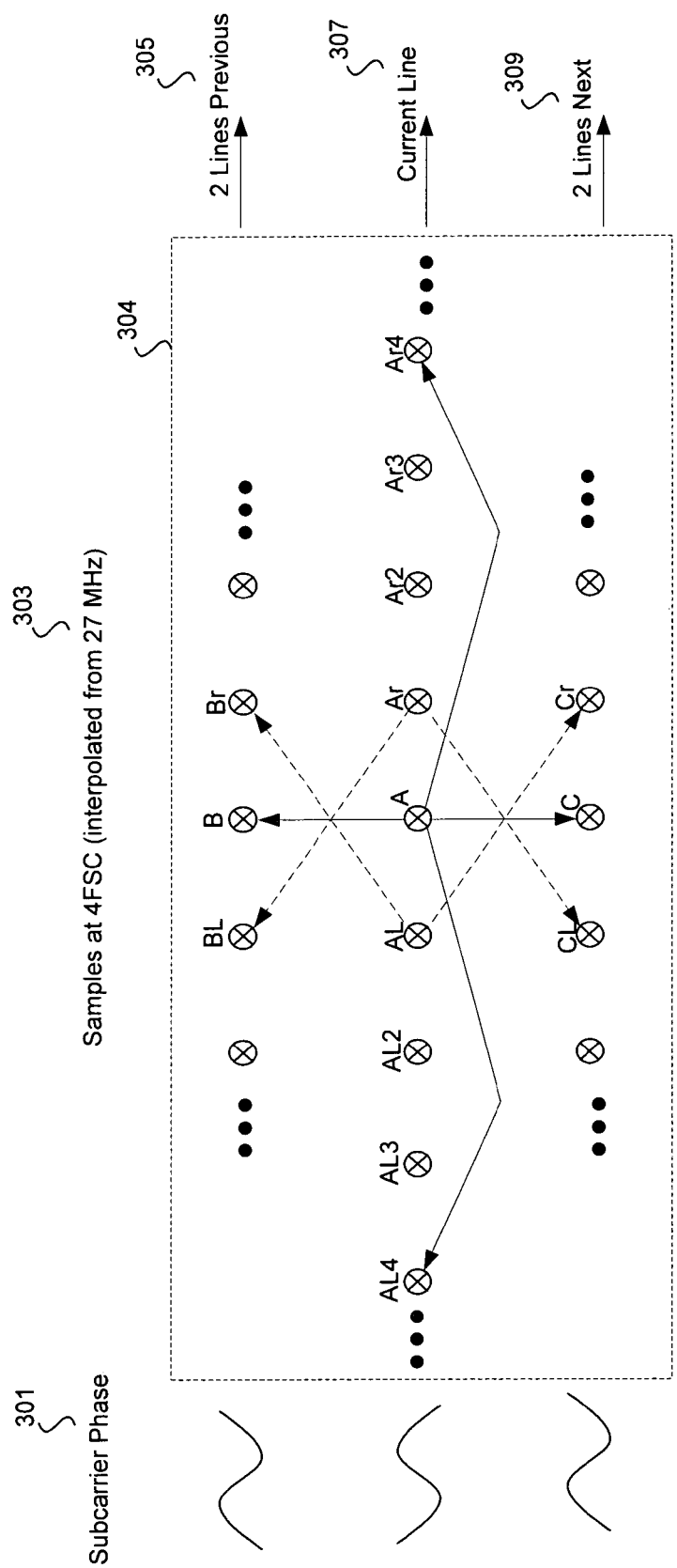
FIG. 3A is a diagram illustrating 2D comb filtering decision logic, in accordance with an embodiment of the invention.

FIG. 3A is a diagram illustrating 2D comb filtering decision logic, in accordance with an embodiment of the invention. Referring now to FIG. 3A, there is illustrated a sample of pixels from three non-adjacent pixel lines in a current frame 304, a current line 307, a two lines previous 305, and a two lines next 309. The subcarrier phase 301 of the incoming composite video signal may be 4.43 MHz, and the incoming analog video signal may be digitized at 27 MHz, for example. Since 4.43 MHz and 27 MHz are not multiples of each other, there may not be an exact pixel sample every 4.43 MHz of digitized video signal that is aligned and in-phase. For example, it may be difficult to compare the peak of a sine wave on the current line 307 with the peak of a sine wave on the two lines next 309, since a pixel sample may not be obtained at the 27 MHz frequency. The composite video signal, therefore, may be run through a filter that interpolates pixel samples 303 at four times the frequency of the subcarrier. For example, if the subcarrier frequency is at 4.43 MHz, the pixel samples 303 may be interpolated at 17.72 MHz.

Pixels A, B and C may be true sample pixels. However, all the remaining pixels to the left and to the right of the true sample pixels A, B and C, such as pixels BL, Br, AL, AL2, AL3, AL4, Ar, Ar2, Ar3, Ar4, CL, and Cr, may be interpolated pixels. In a given pixel line, each pixel may be shifted by a quarter subcarrier cycle from the adjacent pixel. In addition, each line may be 90 degree phase-shifted from its adjacent pixel line. For example, pixel A and interpolated pixel AL4, to the left of pixel A in the current line 407, may be in phase with each other, whereas pixel A and interpolated pixel AL may be quarter cycle phase-shifted from each other. Similarly, interpolated pixel Ar may be a quarter cycle phase-shifted to the right of pixel A, and interpolated pixel Ar4 may be in phase with pixel A. Since the current line 307 may be 180 degrees phase-shifted from either the two lines previous 305 or the two lines next 309, pixel A may also be phase-shifted 180 degrees from either pixel B in the two lines previous 305 or pixel C in the two lines next 309.

In an embodiment of the present invention, the amount of frequency content movement may be approximated between pixels within a given pixel line and between non-adjacent pixel lines within the same video frame, and the corresponding combing method may be applied with a minimum bandwidth loss. For example, if vertical combing is applied with regard to pixel A, then pixel A may be subtracted from pixel B resulting in two times the luma, or pixel A may be subtracted from pixel C to obtain two times the luma, or pixel A may be subtracted from the average of B and C to obtain two times the luma. The same process may be performed between pixel A and interpolated pixel AL2, since they are out of phase The phase difference between pixels A and B is the same as between pixel A and interpolated pixel AL2, i.e. 180 degrees. In order to determine whether vertical combing may be applied without a significant bandwidth loss, pixels in the current line 307 and the two lines previous 305 may be compared. For example, interpolated pixel AL in the current line 307 may be compared with interpolated pixel Br in the two lines previous 305, where interpolated pixel AL is in phase with interpolated pixel Br since there is 360 degree phase difference between them. Similarly, interpolated pixel Ar may be compared with interpolated pixel BL, where interpolated pixel Ar is in phase with interpolated pixel BL since there is 360 degrees phase difference between them as well.

If these two comparisons indicate a big difference, this may be indicative of significant vertical frequency content going from B to A. If the difference between the interpolated pixels in the two comparisons is small, then this may indicate that there is not a lot of vertical frequency content. Accordingly, vertical combing may be applied between the current line 307 and the two lines previous 305 without a significant bandwidth loss. Similarly, comparisons between the interpolated pixels AL and Cr, and Ar and CL may be indicative of whether vertical combing may be applied between the current line 307 and the two lines next 309, without a significant bandwidth loss. Depending on the composite video signal, there may be no frequency content between pixel B and pixel A, which indicates that the current line and the two lines previous are identical lines. A large frequency content between pixel A and pixel C may indicate that a vertical transition has happened immediately after the current line. Conversely, there may be a lot of frequency content between pixel B and pixel A, and no frequency content between pixel A and pixel C. This may be characterized by the fact that the current line and the two lines next are very similar, but the current line and the two lines previous are different. In this case, vertical combing may be performed between the current line and the two lines next.

A final comparison may be performed between pixels A, B and C, in order to determine whether vertical combing may be applied with a minimum bandwidth loss. If pixels A, B and C are, for example, all in phase with each other, this may be indicative that there is no chroma component and pixels A, B and C contain only luma components, for example, if the video signal comprises a white character or a black background. In this case, since there is no frequency content between the current line 307, the two lines previous 305 and the two lines next 309, vertical combing may be applied without a significant loss in bandwidth.

With regard to horizontal combing, or notch filtering, pixel A may be compared with interpolated pixels AL4 and Ar4 in the current line 307, which are in phase with pixel A. This may provide an indication of the horizontal frequency content in the current line 307. If pixel A is very different from either of interpolated pixels AL4 or Ar4, it may indicate that there is significant frequency content in the current line 307. If, on the other hand, the pixels are very similar, it may indicate that there is less frequency content and horizontal combing may be applied. In an embodiment of the present invention, a wide band pass filter may be utilized in order to horizontally filter a composite signal and eliminate the luma component that is not near the chroma subcarrier frequency, for example, a 4.43 MHz subcarrier frequency.

Figure 3B:
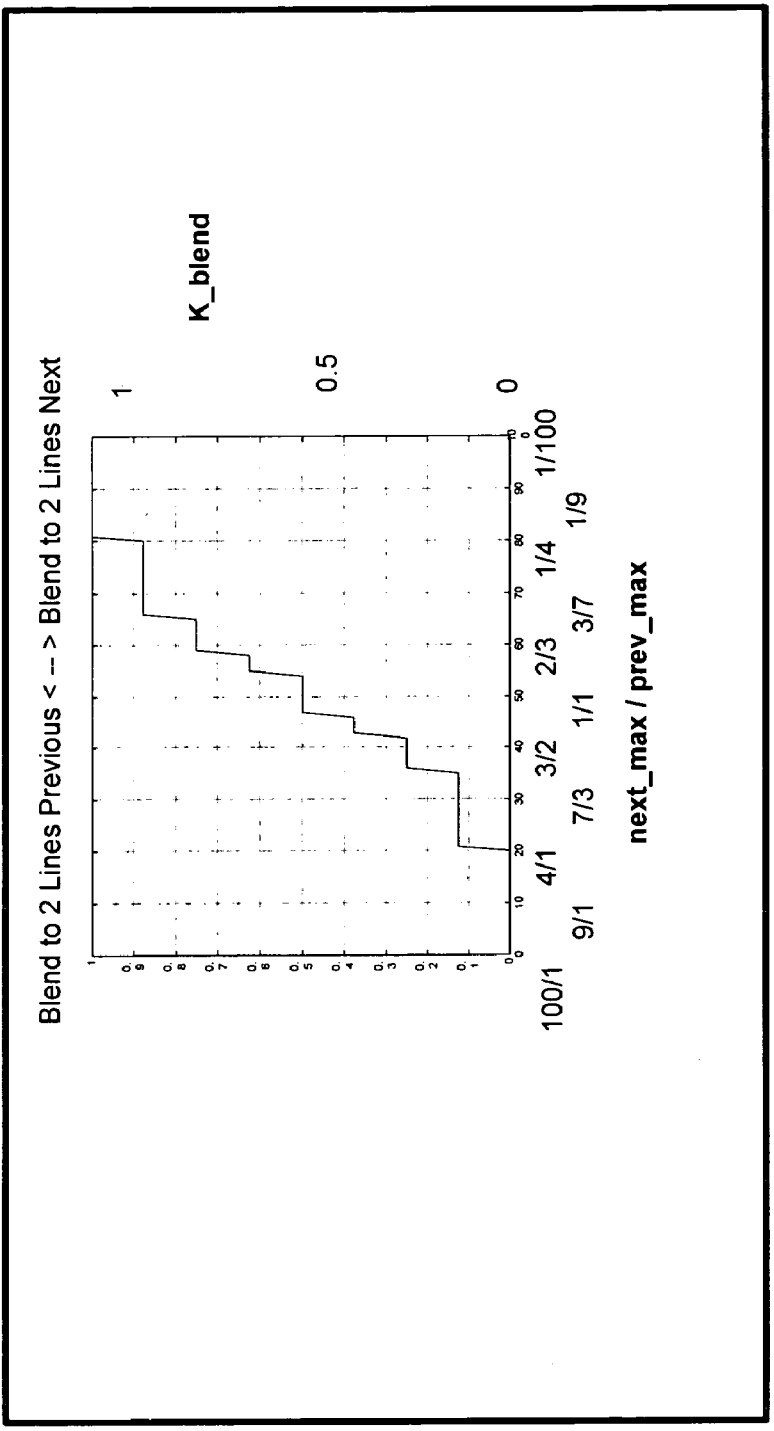
FIG. 3B is a diagram of a blending decision factor related to blending to two lines previous versus blending to two lines next, in accordance with an embodiment of the invention.

FIG. 3B is a diagram of a blending decision factor related to blending to two lines previous versus blending to two lines next, in accordance with an embodiment of the invention. Referring to FIG. 3B, a decision as to the quality of combing with the two lines previous versus combing with the two lines next may be accomplished by calculating a ratio k_blend of the two lines previous comparisons to the two lines next comparisons, for example. The k_blend ratio may be calculated using comparisons and constant multiplies so that it is a value between zero and one. The k_blend ratio may be a non-linear ratio between the comparison of bandwidth between a current pixel line to the two lines previous and the comparison to the two lines next, respectively. A constant value in the k_blend calculation may be utilized to bias strongly against luma only comparisons. In the case of low chroma it may not be desirable to falsely pass the luma only condition. K_blend may be calculated as a function of next_max and prev_max. Next_max may be utilized as a measure of the bandwidth difference between a current line and two lines next, for example. Prev_max may be utilized as a measure of the bandwidth difference between a current line and a two lines previous, for example. K_blend may be a function of the ratio of prev_max to next_max. The larger this ratio, the smaller the value of k_blend. The two lines previous and two lines next may be alpha blended together to comb with the current line. The blend may skew toward next_line when next_max/prev_max ratio is small, and skew toward prev_line when prev_max/next_max ratio is small.

In one aspect of the invention, a different blending decision factor may be determined. A notch filter may be utilized for horizontal combing. In order to obtain a better combing decision, a notch filter may be compared to a vertical comb filter by calculating a ratio of the quality of the vertical comb using the two lines previous, to the quality of the horizontal comb. A different ratio my be related to the quality of the vertical comb using the two lines next, to the quality of the horizontal comb.

Figure 3C:
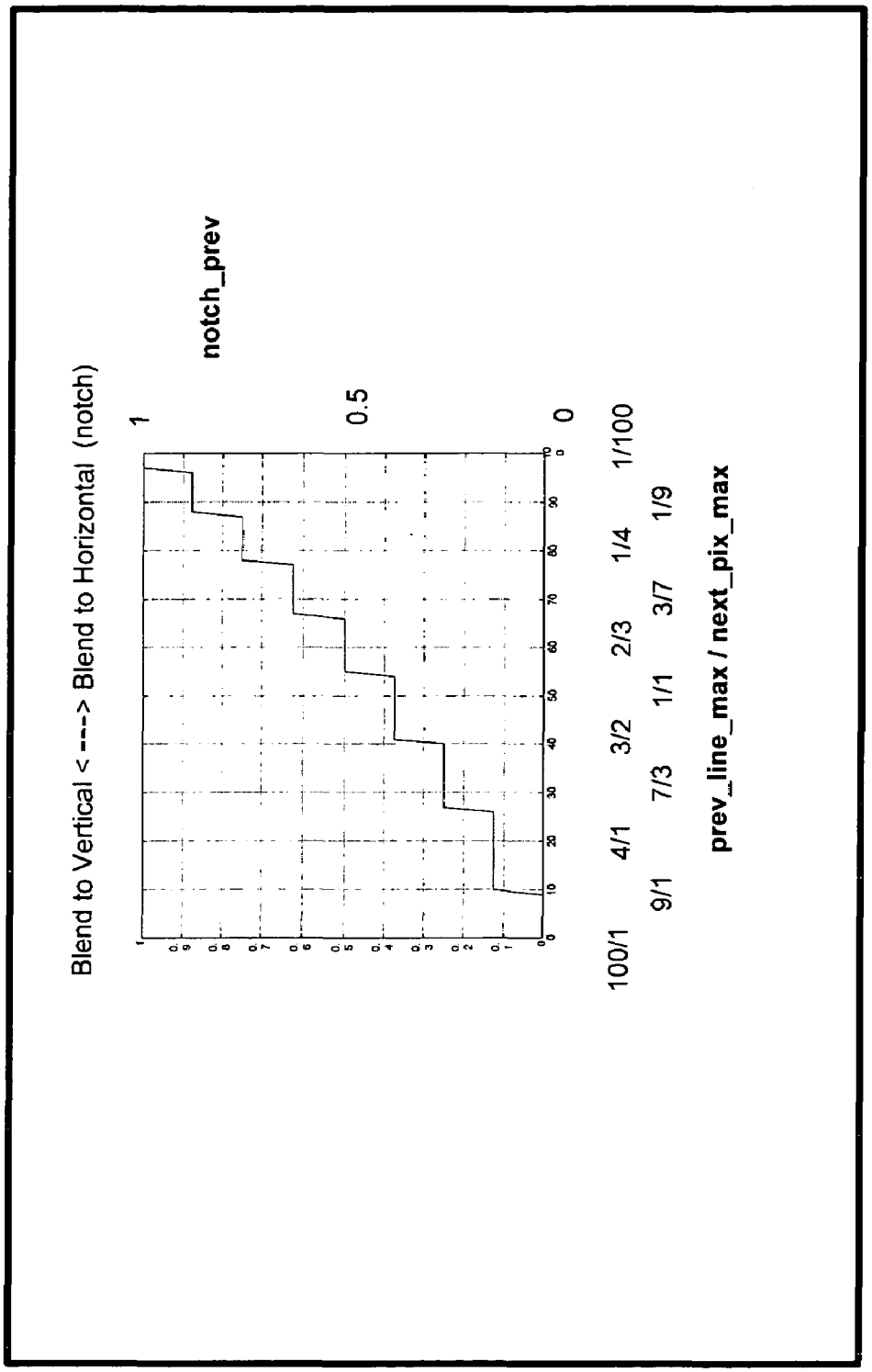
FIG. 3C is a diagram of a blending decision factor related to blending vertically versus blending horizontally, in accordance with an embodiment of the invention.

FIG. 3C is a diagram of a blending decision factor related to blending vertically versus blending horizontally, in accordance with an embodiment of the invention. Referring now to FIG. 3C, a blending decision factor may be determined from a ratio notch_prev, where notch_prev may indicate whether to blend vertically and/or horizontally between a current line and a two lines previous. Notch_prev may be determined as a function of prev_line_max and next_pix_max, for example. Prev_line_max may be a measure of the bandwidth difference between a current line and a two lines previous. Next_pix_max may be a measure of the bandwidth difference between two sets of in-phase pixels in a current line. A higher notch_prev ratio may indicate a preference towards notching versus vertical blending.

A notch_next ratio (not illustrated) may also be determined in a similar way, where notch_next may indicate whether to blend vertically and/or horizontally between a current line and two lines next. A final notch ratio (not illustrated) may be determined as a function of the notch_prev and notch_next ratios in order to obtain a blending decision factor related to blending vertically versus blending horizontally. For example, a final notch value for each pixel may be determined by the following equation:

$$\text{notch} = \text{notch\_next} \cdot k\_blend + \text{notch\_prev} \cdot (1 - k\_blend);$$

Conceptually, if the k_blend combing decision tends towards combing with the two lines previous, the two lines previous may be given more weight in judging the relative quality of notching. If the k_blend combing decision tends towards combing with the two lines next, the two lines next may be given more weight in judging the relative quality of notching.

In cases of significantly more luma than chroma at a given point in a composite signal, a notch filter may be gradually disabled. This is because the notch filter tends to filter the luma and leave the remaining signal in chroma. If the combed signal is mostly luma, it may be inefficient to allow notching as mostly chroma may remain.

Figure 3D:
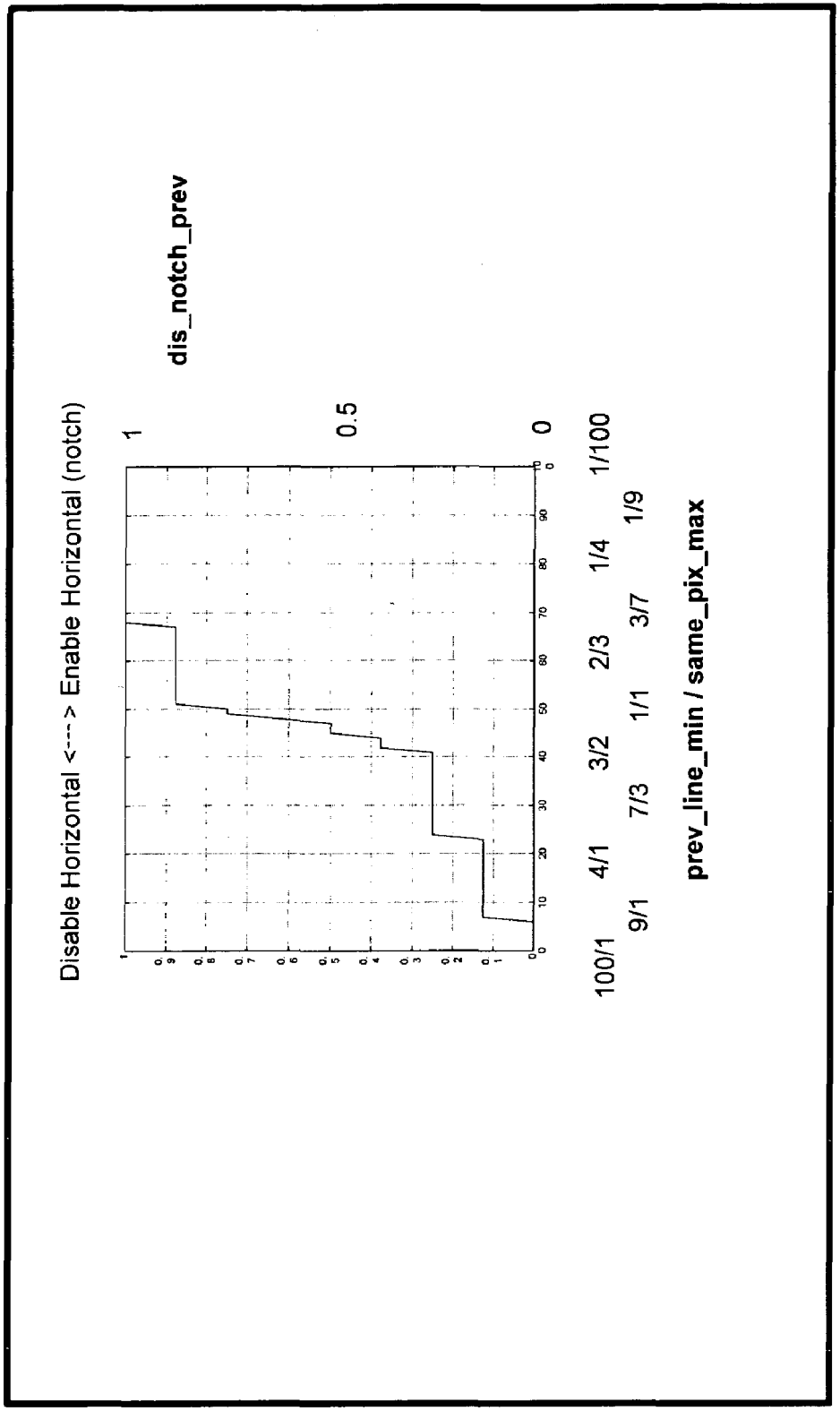
FIG. 3D is a diagram of a blending decision factor related to enabling horizontal combing versus disabling horizontal combing, in accordance with an embodiment of the invention.

FIG. 3D is a diagram of a blending decision factor related to enabling horizontal combing versus disabling horizontal combing, in accordance with an embodiment of the invention. Referring to FIG. 3D, a disable notch signal dis_notch_prev may be generated by a ratio of the two lines previous/two lines next comparison and the two lines previous/two lines next luma only comparison. If the point is mostly luma, the luma only compare will be much smaller than the in phase compare. Dis_notch_prev may be determined as a ratio between prev_line_min and same pix_max, for example. Prev_line_min may be associated with a bandwidth difference between in-phase pixels in a current and two lines previous. Same_pix_max may be associated with a bandwidth difference between out-of-phase pixels in a current, two lines previous and two lines next.

Similarly, a dis_notch_next ratio (not illustrated) may be determined as a ratio between next_line_min and same_pix_max, for example. Next_line_min may be associated with a bandwidth difference between in-phase pixels in a current and two lines next. Dis_notch_next and dis_notch_prev, therefore, may be determined by the ratio of the two lines previous or two lines next luma and chroma compare to the two lines previous or two lines next luma only compare.

If the amplitude of the band pass video signal is very small relative to the difference to the closest matching adjacent line, then the disable notch parameter may not be considered as an accurate measure. In this case, the disable notch may not be used. A disable vertical notch, dis_vert_notch, parameter may be utilized instead.

Figure 3E:
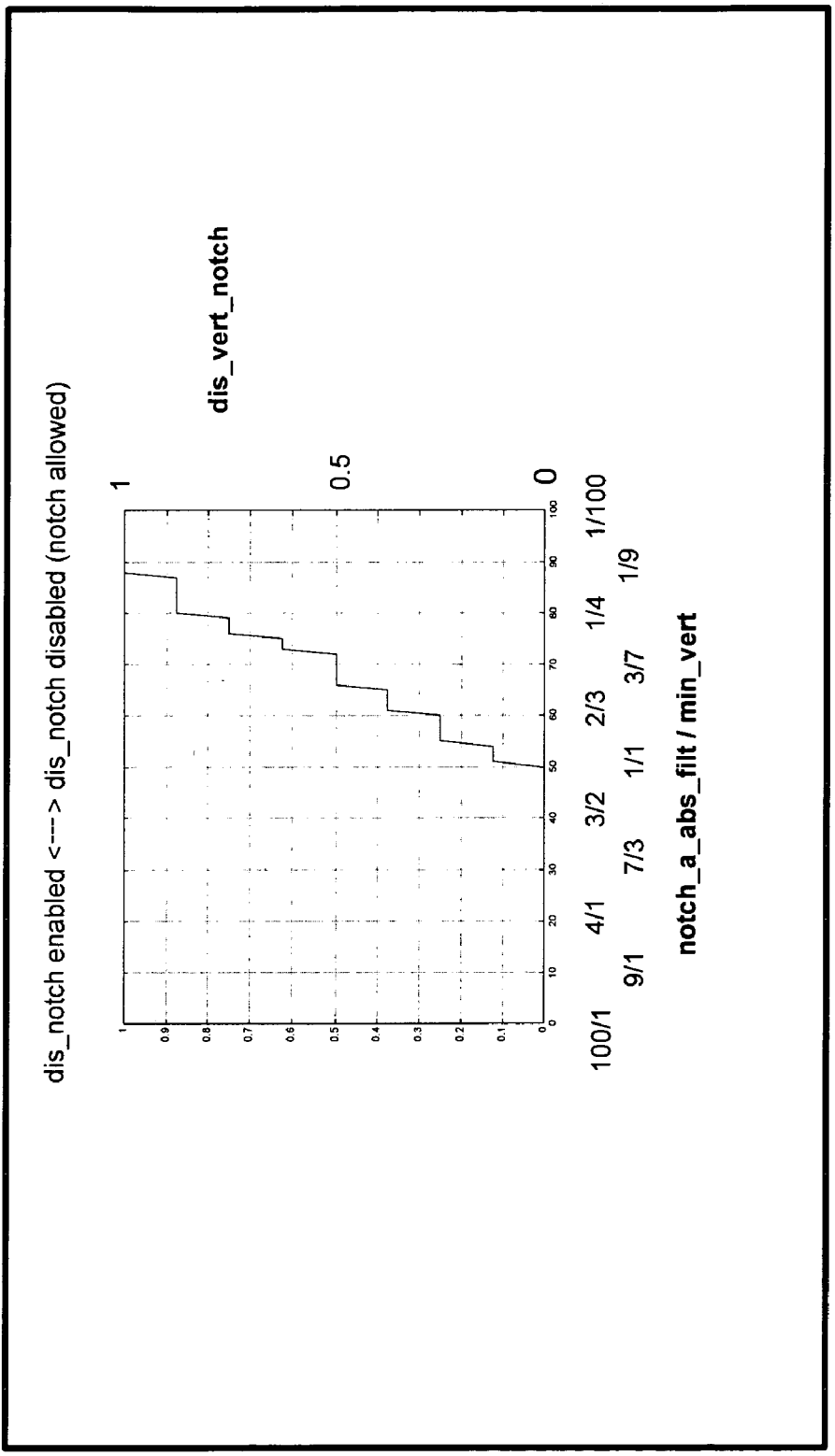
FIG. 3E is a diagram of a blending decision factor related to vertical combing, in accordance with an embodiment of the invention.

FIG. 3E is a diagram of a blending decision factor related to vertical combing, in accordance with an embodiment of the invention. Referring now to FIG. 3E, a dis_vert_notch may be calculated as a ratio of notch_a_abs_filt and min_vert, for example. Notch_a_abs_filt may measure the absolute value of an amplitude of a signal on a current line. Min_vert may be associated with the minimum of bandwidth difference between a current line and two lines previous, and/or a current line and two lines next.

Conceptually, if dis_vert_notch is zero, then it has no effect. Dis_notch may be allowed to mask or not mask the notch. If dis_vert_notch is one, then dis_notch has no effect and dis_notch may be disabled. In this case, notch may not be masked, and the decision to notch or vertically comb may be utilized without modification. A weighted disable notch ratio dis_notch may be calculated as:

dis_notch=max(dis_notch, dis_vert_notch)

The calculated notch signal may be cubed and disable notch may be squared. This may cause the roll off due to notch to be accelerated. Then dis_notch may be used to calculate a final value for notching. Notch may also be low pass filtered and may be generated according to the following equation:

notch=dis_notch^2*notch^3

Figure 4:
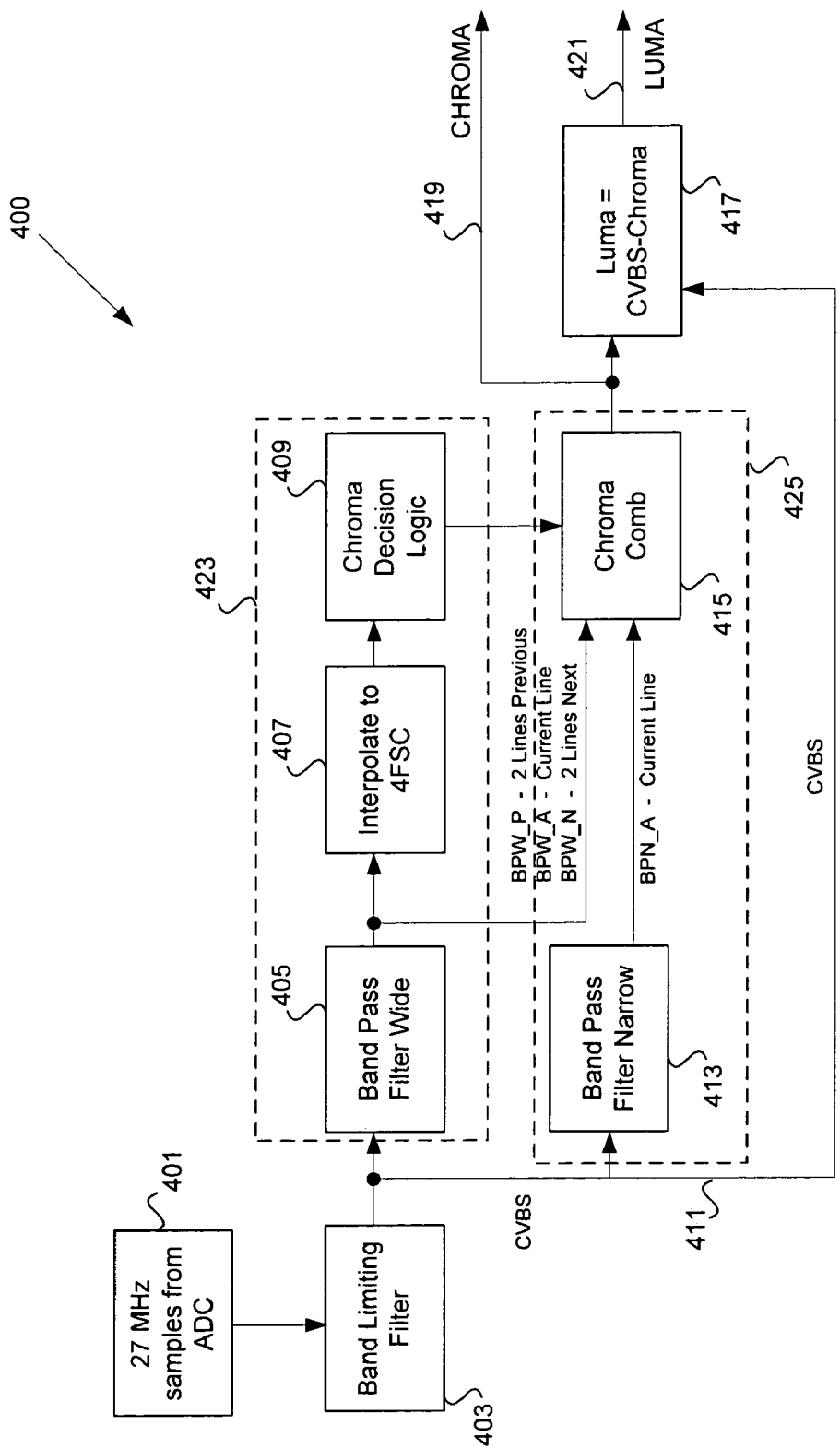
FIG. 4 is a block diagram of an adaptive 2D comb filter that may be utilized in accordance with the invention.

FIG. 4 is a block diagram of an adaptive 2D comb filter that may be utilized in accordance with the invention. Referring now to FIG. 4, the 2D comb filter 400 may comprise an analog-to-digital converter (ADC) 401, a band limiting filter 403, a decision stage 423, a blending stage 425, and a processor 417. The decision stage 423 may comprise a wide band-pass filter 405, pixel interpolation logic 407, and a chroma decision logic 409. The blending stage 425 may comprise a narrow band-pass filter 413 and a chroma comb 415.

The ADC 401 receives an analog composite video signal and converts this signal to a digital signal containing 27 MHz pixel samples. The digital signal containing the 27 MHz pixel samples is then band limited by the band limiting filter 403. The band limited composite video broadcast signal (CVBS) 411 from the band limited filter 403 is then transferred to the decision stage 423, the blending stage 425 and the processor 417. Within the decision stage 423, the wide band-pass filter 405 may be utilized to pre-filter the very low and very high frequency luma component within the composite video signal. In this way, if there is very coarse (VC), slow moving luma changes, such VC luma may be eliminated and not be considered in subsequent vertical and/or temporal combing processes. If a subcarrier frequency of 4.43 MHz is utilized, chroma components may be centered around 4.43 MHz, or approximately between 2 and 5 MHz. In other words, any frequency content below 2 MHz may be considered a luma component and may be filtered out by the band pass filter.

The pixel interpolation logic 407 may comprise suitable circuitry, logic and/or code and may be adapted to interpolate pixels in non-adjacent pixel lines, as outlined on FIG. 3A. The interpolated pixels may then be utilized by the chroma decision logic 409. The chroma decision logic 409 may comprise suitable circuitry, logic and/or code and may be utilized to perform comparisons between pixels in a current pixel line and/or pixels in non-adjacent pixel lines, as outlined on FIG. 3A. The chroma decision logic may also be adapted to generate various blending ratios that may be utilized by the blending stage 425 to accomplish blending of horizontal and/or vertical combing. For example, the chroma decision logic 409 may be adapted to generate the k_blend and notch ratios utilized in blending 2D combing.

Within the blending stage 425, the composite signal 411 may first be filtered by the narrow band-pass filter 413. In this way, a narrow chroma signal may be generated. The narrow chroma signal, together with the wide band pass filtered signal from the output of filter 405, may be transferred to the chroma comb 415. The chroma comb 415 may comprise suitable logic, circuitry and/or code and may be adapted to blend combing between the received composite signal from the filter 405 and the narrow chroma signal from the filter 413. The chroma comb 415 may also be adapted to utilize blending ratios, such as k_blend and notch ratios, received from the chroma decision logic 409. The chroma comb 415 may generate the separated chroma component 419 at its output. The separated chroma component may then be utilized by the processor 417 to obtain the luma component 421. In order to obtain the luma component 421, the processor 417 may be adapted to subtract the chroma component 419 from the CVBS 411.

In another aspect of the invention, the chroma component 419 may be further separated into a U and a V component utilizing blending ratios generated by the decision stage 423.

Figure 5:
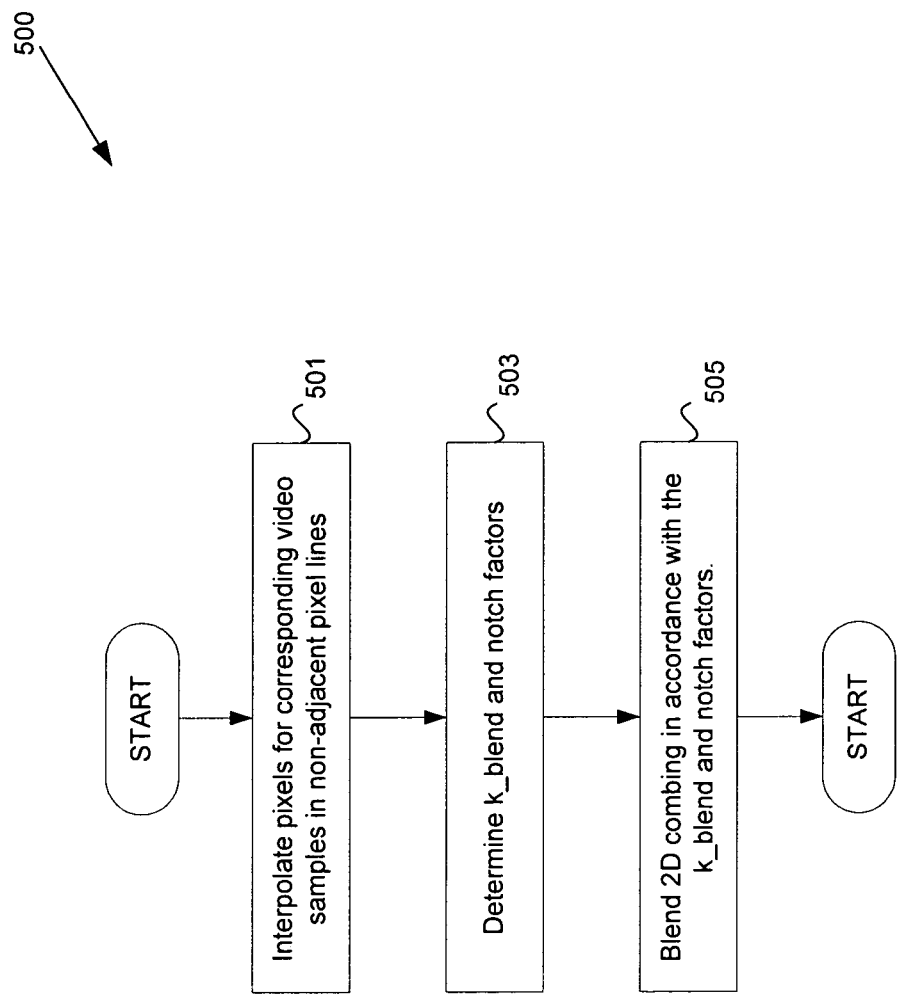
FIG. 5 is a flow diagram of an exemplary method for 2D comb filtering, in accordance with an embodiment of the invention.

FIG. 5 is a flow diagram of an exemplary method 500 for 2D comb filtering, in accordance with an embodiment of the invention. Referring to FIG. 5, at 501, pixels for corresponding video samples in non-adjacent pixel lines may be interpolated. For example, for a PAL composite video signal, pixels in a current pixel line, two lines previous and two lines next may be interpolated. At 503, blending ratios may be determined by a chroma decision logic. For example, a chroma decision logic in accordance with the invention, may be adapted to determine k_blend and notch ratios that may be utilized for blending 2D combing of the PAL composite video signal. At 505, 2D combing of the PAL composite video signal may be blended by utilizing the determined k_blend and notch ratios. For example, horizontal blending within a pixel line may be blended with vertical blending between a current pixel line and a two line previous and/or a two lines next.

In a different aspect of the invention, an estimate may be obtained of the quality of the 2D comb. This may be calculated based on the difference between the current pixel and the pixel that the 2D combing logic decided to utilize for combing. For example, a vertical difference may be calculated according to the ratio of k_blend, which may then be blended with the horizontal quality according to the ratio of notch. The qualities of the vertical blends, two lines previous and two lines next, may be weighted together to obtain an overall vertical quality measure. The vertical quality measure may then be weighted together with the horizontal quality measure, thus providing an overall quality measure of the 2D comb.

Figure 6:
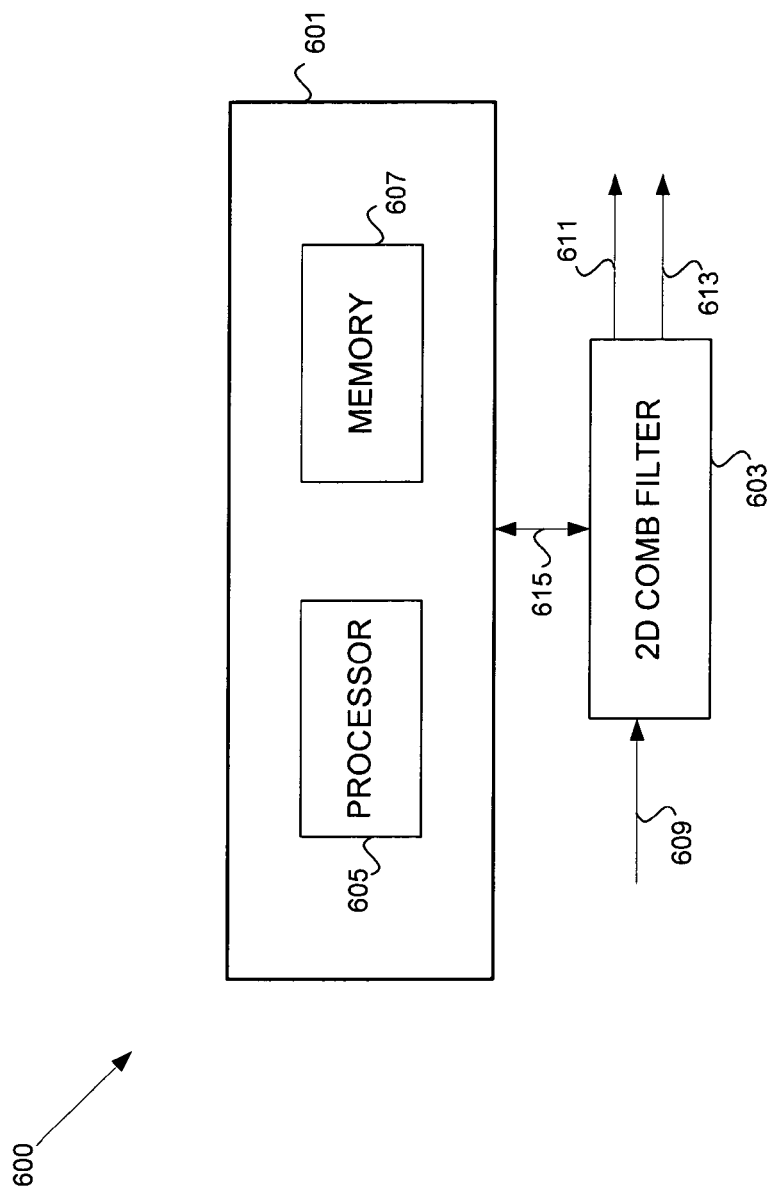
FIG. 6 is a block diagram of an exemplary system that may be used in connection with 2D combing, in accordance with an embodiment of the invention.

FIG. 6 is a block diagram of an exemplary system that may be used in connection with 2D combing, in accordance with an embodiment of the invention. Referring to FIG. 6, the system 600 may comprise a host 601 and a 2D comb filter 603. The host 601 may comprise a processor 605 and a host memory 607. The host 601 may be communicatively coupled to the comb filter 603 via an interface bus 615. In another embodiment of the present invention, the comb filter 603 may be a part of the host 601.

In operation, the 2D comb filter 603 may comprise suitable logic, circuitry and/or code and may be adapted to receive a video signal 609, separate the chroma and luma components, and then output the chroma component 611 and the luma component 613 separately. The video signal 609 may be a PAL composite video signal. The processor 605 may generate a plurality of interpolated pixels for corresponding video samples in non-adjacent pixel lines for a video frame in the video signal 609. The non-adjacent pixel lines may be at least one pixel line apart. The processor 605 may determine a direction of least bandwidth among the video samples and the interpolated pixels, and may blend combing according to the determined direction of least bandwidth. The processor 605 may generate a plurality of interpolated pixels for corresponding video samples in a first pixel line of the video frame. The processor 605 may also shift the plurality of interpolated pixels in the first pixel line, so that each of the plurality of interpolated pixels in the first pixel line is one quarter cycle phase-shifted with respect to a corresponding adjacent pixel in the first pixel line.

The processor 605 may comb horizontally, if the determined direction of least bandwidth is among in-phase pixels in the first pixel line. The processor 605 may also generate a plurality of interpolated pixels for corresponding video samples in a non-adjacent second pixel line of the video frame, so that each of the plurality of interpolated pixels in the second line is one half cycle phase-shifted with respect to a corresponding pixel in the first pixel line. If the determined direction of least bandwidth is among corresponding in-phase pixels in the first pixel line and in the second pixel line, the processor 605 may comb vertically. If the determined direction of least bandwidth is among corresponding one-half cycle phase-shifted video samples in the first pixel line and in the second pixel line for a luma-only video signal, the at least one processor may comb vertically. The processor 605 may comb in a horizontal direction and a vertical direction for the video frame. The processor 605 may blend combing in a horizontal direction and in a vertical direction for the video frame in order to maximize output video quality and minimize or eliminate artifacts.

Accordingly, the invention may be realized in hardware, software, or a combination of hardware and software. The invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for separating luma and chroma components in a composite video signal, the method comprising:
   generating a plurality of interpolated pixels for corresponding video samples in non-adjacent pixel lines for a video frame;
   determining at least one direction of least bandwidth among the video samples and the interpolated pixels; and
   blending combing according to the determined at least one direction of least bandwidth.

2. The method of claim 1, comprising generating a plurality of interpolated pixels for corresponding video samples in a first pixel line of the video frame.

3. The method of claim 2, comprising shifting the plurality of interpolated pixels in the first pixel line, so that each of the plurality of interpolated pixels in the first pixel line is one quarter cycle phase-shifted from a corresponding adjacent pixel in the first pixel line.

4. The method of claim 3, comprising combing horizontally, if the determined direction of least bandwidth is among in-phase pixels in the first pixel line.

5. The method of claim 2, comprising generating a plurality of interpolated pixels for corresponding video samples in a non-adjacent second pixel line of the video frame, so that each of the plurality of interpolated pixels in the second line is one half cycle phase-shifted from a corresponding pixel in the first pixel line.

6. The method of claim 5, comprising combing vertically, if the determined direction of least bandwidth is among corresponding in-phase pixels in the first pixel line and in the second pixel line.

7. The method of claim 5, comprising combing vertically, if the determined direction of least bandwidth is among corresponding one-half cycle phase-shifted video samples in the first pixel line and in the second pixel line for a luma-only video signal.

8. The method of claim 1, comprising combing in a horizontal direction and a vertical direction for the video frame.

9. The method of claim 8, comprising blending the combing in a horizontal direction and a vertical direction for the video frame.

10. The method of claim 1, wherein the non-adjacent pixel lines are at least one pixel line apart.

11. A machine-readable storage having stored thereon, a computer program having at least one code section for separating luma and chroma components in a composite video signal, the at least one code section being executable by a machine for causing the machine to perform steps comprising:
   generating a plurality of interpolated pixels for corresponding video samples in non-adjacent pixel lines for a video frame;
   determining at least one direction of least bandwidth among the video samples and the interpolated pixels; and
   blending combing according to the determined direction of least bandwidth.

12. The machine-readable storage of claim 11, comprising code for generating a plurality of interpolated pixels for corresponding video samples in a first pixel line of the video frame.

13. The machine-readable storage of claim 12, comprising code for shifting the plurality of interpolated pixels in the first pixel line, so that each of the plurality of interpolated pixels in the first pixel line is one quarter cycle phase-shifted from a corresponding adjacent pixel in the first pixel line.

14. The machine-readable storage of claim 13, comprising code for combing horizontally, if the determined direction of least bandwidth is among in-phase pixels in the first pixel line.

15. The machine-readable storage of claim 12, comprising code for generating a plurality of interpolated pixels for corresponding video samples in a non-adjacent second pixel line of the video frame, so that each of the plurality of interpolated pixels in the second line is one half cycle phase-shifted from a corresponding pixel in the first pixel line.

16. The machine-readable storage of claim 15, comprising code for combing vertically, if the determined direction of least bandwidth is among corresponding in-phase pixels in the first pixel line and in the second pixel line.

17. The machine-readable storage of claim 15, comprising code for combing vertically, if the determined direction of least bandwidth is among corresponding one-half cycle phase-shifted video samples in the first pixel line and in the second pixel line for a luma-only video signal.

18. The machine-readable storage of claim 11, comprising code for combing in a horizontal direction and a vertical direction for the video frame.

19. The machine-readable storage of claim 18, comprising code for blending the combing in a horizontal direction and a vertical direction for the video frame.

20. The machine-readable storage of claim 11, wherein the non-adjacent pixel lines are at least one pixel line apart.

21. A system for separating luma and chroma components in a composite video signal, the system comprising:
    a pixel interpolation logic that generates a plurality of interpolated pixels for corresponding video samples in non-adjacent pixel lines for a video frame;
    a chroma decision logic that determines at least one direction of least bandwidth among the video samples and the interpolated pixels; and
    a chroma comb that blends combing according to the determined direction of least bandwidth.

22. The system of claim 21, wherein the pixel interpolation logic generates a plurality of interpolated pixels for corresponding video samples in a first pixel line of the video frame.

23. The system of claim 22, wherein the pixel interpolation logic shifts the plurality of interpolated pixels in the first pixel line, so that each of the plurality of interpolated pixels in the first pixel line is one quarter cycle phase-shifted from a corresponding adjacent pixel in the first pixel line.

24. The system of claim 23, wherein the chroma comb combs horizontally, if the determined direction of least bandwidth is among in-phase pixels in the first pixel line.

25. The system of claim 22, wherein the pixel interpolation logic generates a plurality of interpolated pixels for corresponding video samples in a non-adjacent second pixel line of the video frame, so that each of the plurality of interpolated pixels in the second line is one half cycle phase-shifted from a corresponding pixel in the first pixel line.

26. The system of claim 25, wherein the chroma comb combs vertically, if the determined direction of least bandwidth is among corresponding in-phase pixels in the first pixel line and in the second pixel line.

27. The system of claim 25, wherein the chroma comb combs vertically, if the determined direction of least bandwidth is among corresponding one-half cycle phase-shifted video samples in the first pixel line and in the second pixel line for a luma-only video signal.

28. The system of claim 21, wherein the chroma comb combs in a horizontal direction and a vertical direction for the video frame.

29. The system of claim 28, wherein the chroma comb blends the combing in a horizontal direction and a vertical direction for the video frame.

30. The system of claim 21, wherein the non-adjacent pixel lines are at least one pixel line apart.

31. A method for separating luma and chroma components in a composite video signal, the method comprising combing among non-adjacent pixel lines utilizing non-thresholded blending based on relative bandwidth in each of a plurality of two directions.

32. The method of claim 31, comprising combing utilizing non-thresholded blending based on relative bandwidth in a horizontal direction.

33. The method of claim 31, comprising combing utilizing non-thresholded blending based on relative bandwidth in a vertical direction.

* * * * *